(12) United States Patent
Kuroki et al.

(10) Patent No.: US 10,009,491 B2
(45) Date of Patent: Jun. 26, 2018

(54) IMAGE FORMATION APPARATUS

(71) Applicant: KYOCERA Document Solutions Inc., Osaka-shi, Osaka (JP)

(72) Inventors: Hirofumi Kuroki, Osaka (JP); Mikiya Kitagawa, Osaka (JP); Keiji Okumura, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days. days.

(21) Appl. No.: 15/543,148

(22) PCT Filed: Apr. 1, 2016

(86) PCT No.: PCT/JP2016/060916
§ 371 (c)(1),
(2) Date: Jul. 12, 2017

(87) PCT Pub. No.: WO2016/163317
PCT Pub. Date: Oct. 13, 2016

(65) Prior Publication Data
US 2018/0013905 A1    Jan. 11, 2018

(30) Foreign Application Priority Data

Apr. 6, 2015 (JP) ................................. 2015-077554

(51) Int. Cl.
| | | |
|---|---|---|
| G06K 15/00 | (2006.01) | |
| H04N 1/00 | (2006.01) | |
| G03G 15/00 | (2006.01) | |
| H04N 1/44 | (2006.01) | |

(52) U.S. Cl.
CPC ......... *H04N 1/00496* (2013.01); *G03G 15/50* (2013.01); *H04N 1/0044* (2013.01); *H04N 1/4426* (2013.01); *H04N 1/00411* (2013.01); *H04N 2201/0094* (2013.01)

(58) Field of Classification Search
CPC ...................................................... G03G 15/50
See application file for complete search history.

(56) References Cited

U.S. PATENT DOCUMENTS

| | | | | |
|---|---|---|---|---|
| 2002/0150403 | A1* | 10/2002 | Katsuyama | ........ G03G 15/6552 399/107 |
| 2012/0249337 | A1* | 10/2012 | Sekita | ................. H04M 1/7253 340/686.1 |
| 2014/0233162 | A1* | 8/2014 | Katsuyama | .......... H04N 1/0035 361/679.01 |

FOREIGN PATENT DOCUMENTS

JP         2014202911 A     10/2014

* cited by examiner

*Primary Examiner* — Moustapha Diaby
(74) *Attorney, Agent, or Firm* — Alleman Hall Creasman & Tuttle LLP (57) ABSTRACT

The operation unit (5) is configured to receive user's operation and supported at a position frontward of the image reading unit (2) by the support housing (10) so as to be rotatable within a predetermined rotation range around a rotation shaft parallel to a right-left direction of the image formation apparatus (100). The information reading unit (6) is configured to read information about the user and housed in the housing side surface (12) so that a part of the information reading unit (6) is present rearward of the operation unit (5) in a first attitude in which a surface of the operation unit (5) is closest to a vertical plane, and a part of the information reading unit (6) is present downward of the operation unit (5) in a second attitude in which the surface of the operation unit (5) is closest to a horizontal plane.

11 Claims, 11 Drawing Sheets

IMAGE FORMATION APPARATUS

TECHNICAL FIELD

The present invention relates to an image formation apparatus including an IC reader for reading information from an IC card, and the like.

BACKGROUND ART

Some of image formation apparatuses such as multifunction peripherals are provided with an IC reader capable of reading information about a user from an IC card. The IC reader may be housed in a front surface of the image formation apparatus (see, for example, Patent Literature 1).

CITATION LIST

Patent Literature

[PTL 1] Japanese Laid-Open Patent Publication No. 2014-202911

SUMMARY OF THE INVENTION

Problems to be Solved by the Invention

A user of this type of image formation apparatus causes the IC reader to read the user's IC card, and then performs operation using an operation unit such as a touch panel. Thus, at the start of using the image formation apparatus, a predetermined series of user's operations are performed. At this time, the more the positions of the IC reader and the operation unit are separate from each other, the wider the necessary operation range of the user is.

An object of the present invention is to provide an image formation apparatus that enables reduction in the necessary operation range when a user uses an information reading unit and an operation unit.

Solution to the Problems

An image formation apparatus according to one aspect of the present invention includes an image reading unit, an image forming unit, a support housing, an operation unit, and an information reading unit. The image reading portion is configured to read an image from a document. The image forming unit is located below the image reading unit and configured to form an image on a sheet. The support housing is located between the image reading unit and the image forming unit and forms at least a part of a housing side surface and a housing front surface of the image formation apparatus. The operation unit is configured to receive user's operation and supported at a position frontward of the image reading unit by the support housing so as to be rotatable within a predetermined rotation range around a rotation shaft parallel to a right-left direction of the image formation apparatus. The information reading unit is configured to read information about the user and housed in the housing side surface so that a part of the information reading unit is present rearward of the operation unit in a first attitude in which a surface of the operation unit is closest to a vertical plane, and a part of the information reading unit is present downward of the operation unit in a second attitude in which the surface of the operation unit is closest to a horizontal plane.

Advantageous Effects of the Invention

The present invention can provide an image formation apparatus that enables reduction in the necessary operation range when a user uses an information reading unit and an operation unit.

DESCRIPTION OF EMBODIMENTS

Hereinafter, with reference to the accompanying drawings, embodiments of the present invention will be described for understanding of the present invention. The following embodiments are merely examples embodying the present invention, and are not intended to limit the technical scope of the present invention.

[Schematic Configuration of Image Formation Apparatus 100]

Figure 1:
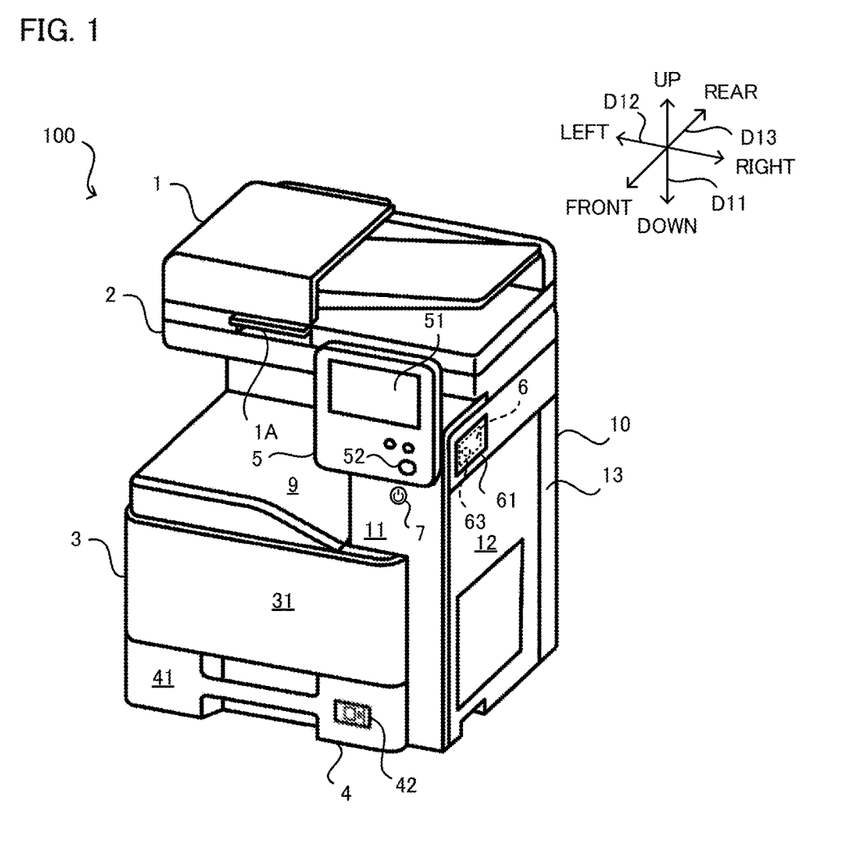
FIG. 1 is a perspective view of an image processing apparatus according to an embodiment of the present invention.
Figure 2:
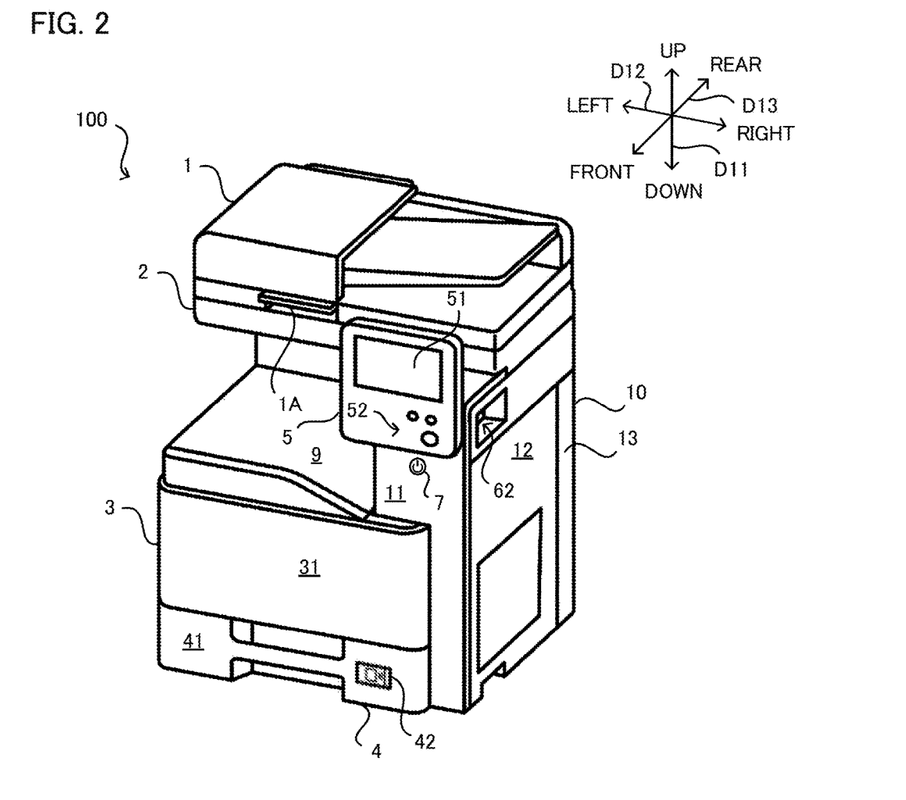
FIG. 2 is a perspective view of the image processing apparatus according to the embodiment of the present invention.
Figure 3:
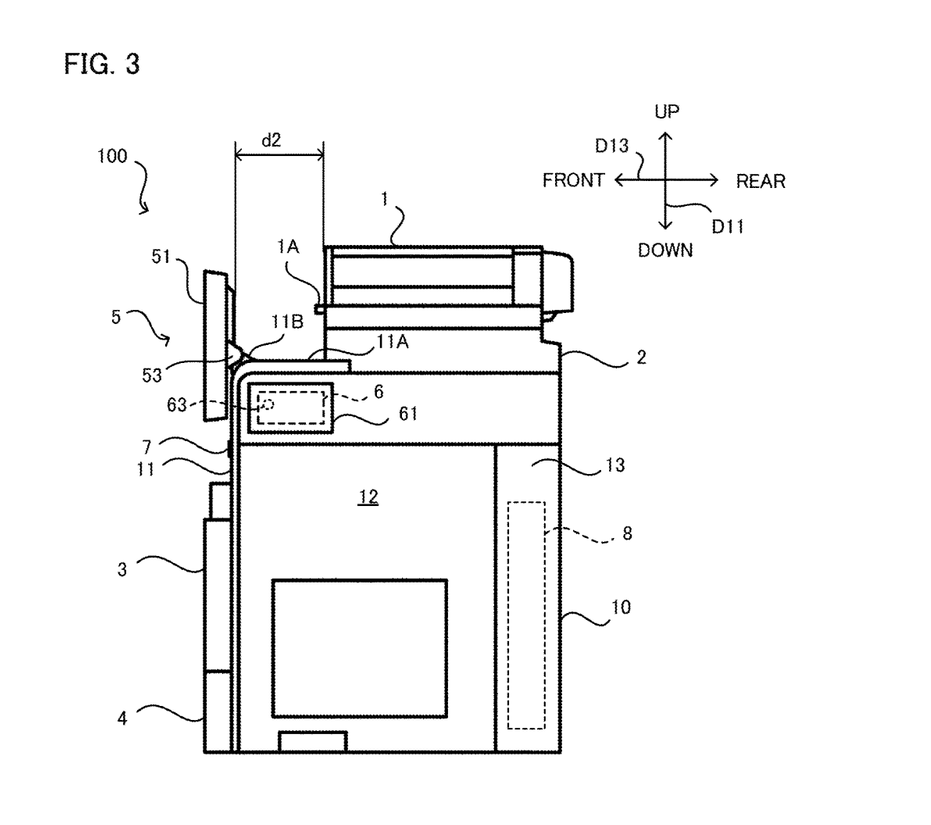
FIG. 3 is a right side view of the image processing apparatus according to the embodiment of the present invention.
Figure 4:
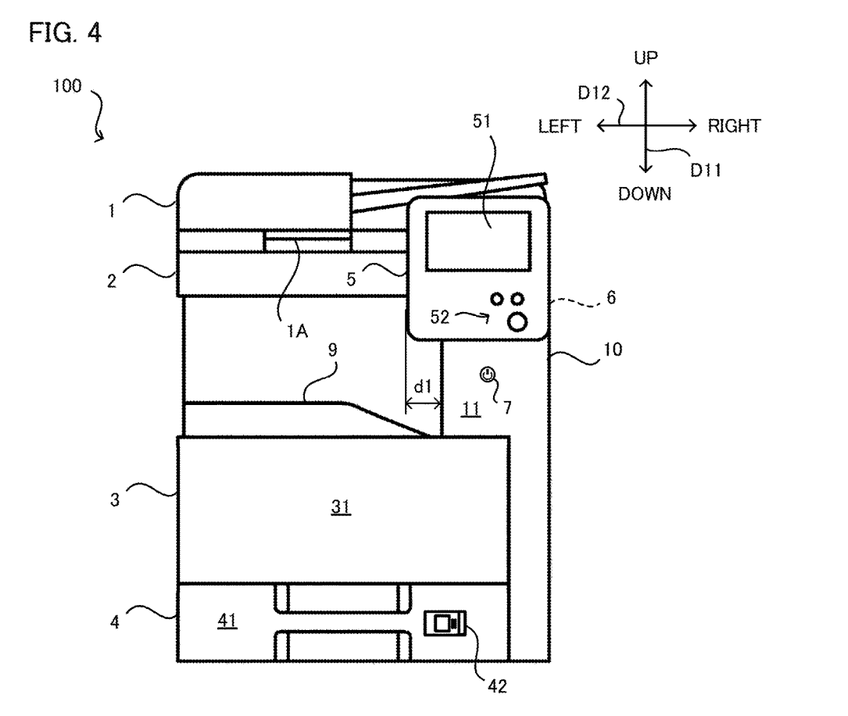
FIG. 4 is a front view of the image processing apparatus according to the embodiment of the present invention.

With reference to FIG. 1 to FIG. 4, a schematic configuration of an image formation apparatus 100 according to an embodiment of the present invention will be described. Here, FIG. 1 and FIG. 2 are perspective views of the image formation apparatus 100. FIG. 3 is a right side view of the image formation apparatus 100. FIG. 4 is a front view of the image formation apparatus 100. In the following description, an up-down direction D11, a right-left direction D12, and a front-rear direction D13 shown in the drawings are used as necessary.

The image formation apparatus 100 includes an ADF 1, an image reading unit 2, an image forming unit 3, a sheet feed cassette 4, an operation unit 5, an IC reader 6, a power switch 7, a control unit 8, an in-body discharge unit 9, a support housing 10, and the like. The image formation apparatus 100 is a multifunction peripheral having a plurality of functions such as a facsimile function or a copy function, as well as a scanning function of reading image data from a document and a print function of forming an image on the basis of image data.

The ADF 1 is an automatic document feeder which includes a document set portion, a conveyance roller, a document holder, and a sheet discharge portion, and conveys a document to be read by the image reading unit 2. The image reading unit 2 includes a document table, a light source, a mirror, an optical lens, and a CCD (Charge Coupled Device), and is capable of reading an image from a document and outputting the read image as image data. The image reading unit 2 is located above the image forming unit 3, and the ADF 1 is located above the image reading unit 2. The ADF 1 is openable and closable with respect to the image reading unit 2, and a grip portion 1A used for user's operation of opening or closing the ADF 1 is provided to the ADF 1.

[Sheet Feed Cassette 4]

The sheet feed cassette 4 is mountable to and detachable from the image formation apparatus 100. The sheet feed cassette 4 stores sheets to be fed to the image forming unit 3. On a front surface 41 of the sheet feed cassette 4, a cassette display portion 42 is provided which displays information about sheets such as the size and type of sheets stored in the sheet feed cassette 4. Specifically, the cassette display portion 42 is located in an area that is near the right end on the front surface 41 of the sheet feed cassette 4 and that corresponds to a position vertically downward of the operation unit 5. The cassette display portion 42 may be located near the left end on the front surface 41 of the sheet feed cassette 4.

Figure 5:
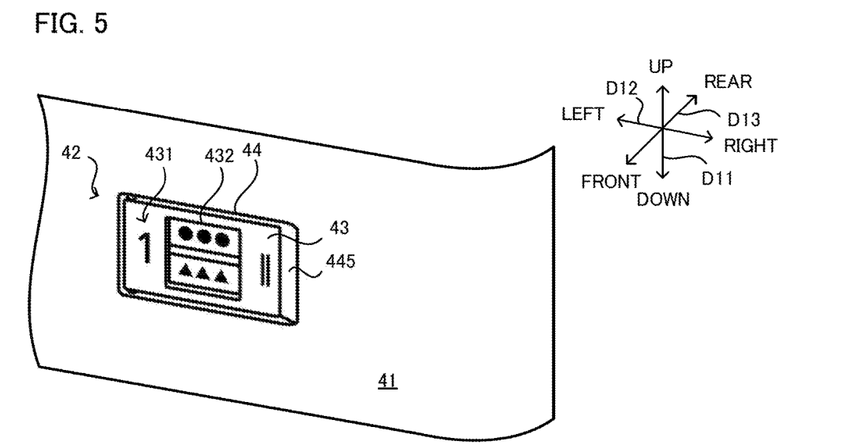
FIG. 5 is a perspective view showing a cassette display portion of the image processing apparatus according to the embodiment of the present invention.
Figure 6:
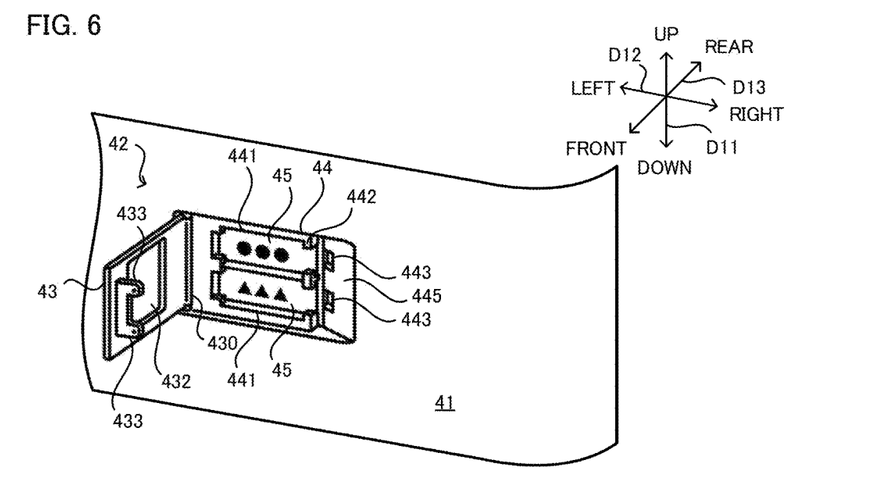
FIG. 6 is a perspective view showing the cassette display portion of the image processing apparatus according to the embodiment of the present invention.
Figure 7:
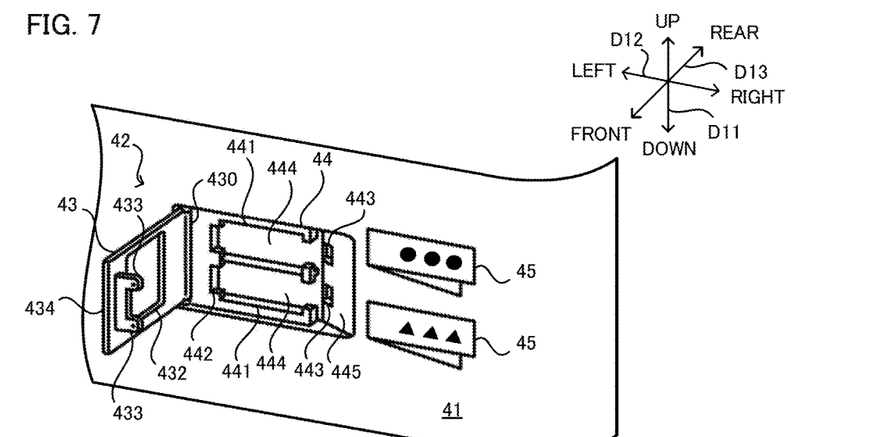
FIG. 7 is a perspective view showing the cassette display portion of the image processing apparatus according to the embodiment of the present invention.
Figure 8:
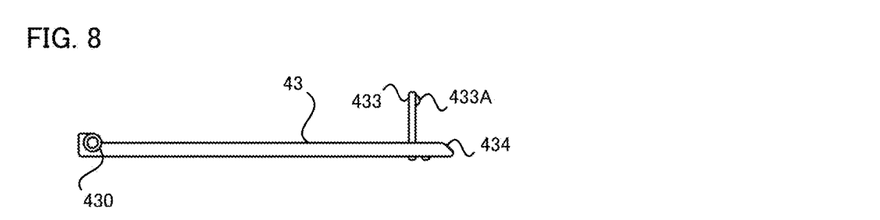
FIG. 8 is a view showing a cover of the cassette display portion of the image processing apparatus according to the embodiment of the present invention.

Here, FIG. 5 to FIG. 7 are perspective views showing a specific part of the front surface 41 of the sheet feed cassette 4, including the cassette display portion 42, and FIG. 8 is a plan view of a cover 43. As shown in FIG. 5 to FIG. 7, the cassette display portion 42 includes the cover 43, a mounting portion 44, and a display sheet 45 (example of information display member).

The cover 43 has a rotation shaft 430, a stage number display portion 431, a window member 432, engagement portions 433, and a slope surface 434. The rotation shaft 430 is a shaft parallel to the vertical direction, and the cover 43 is supported by the rotation shaft 430 so as to be openable and closable with respect to the mounting portion 44. On the stage number display portion 431, a number indicating the number of the stage at which the sheet feed cassette 4 is used is described in advance.

The window member 432 is a light-transmitting acrylic resin or the like that allows the display sheet 45 inserted into the mounting portion 44 to be viewed from outside. Instead of providing the window member 432 to the cover 43, the cover 43 may have an opening at a position corresponding to the window member 432.

The engagement portions 433 maintain the closed state of the cover 43 by being engaged with later-described engaged portions 443 provided to the mounting portion 44. Specifically, as shown in FIG. 8, the engagement portions 433 has projections 433A and maintains the closed state of the cover 43 by being fitted to fitted portions (recesses) formed in the engaged portions 443. On the other hand, when the cover 43 is drawn frontward, the engagement portions 433 bend and the projections 433A are detached from the fitted portions, whereby the cover 43 is opened.

Here, as shown in FIG. 8, the slope surface 434 of the cover 43 is formed, on the cover 43, at a position that is at the upstream end in the direction in which the display sheet 45 is inserted into the mounting portion 44, and that corresponds to a slope surface 445 of the mounting portion 44. The slope surface 434 has a slope that is in the same direction as the slope surface 445 and steeper than the slope surface 445. This allows a user to easily open the cover 43 by, for example, inserting a finger between the slope surface 434 of the cover 43 and the slope surface 445 of the mounting portion 44.

In the sheet feed cassette 4 of this type, if the mounting portion 44 in which the display sheet 45 is inserted is provided so as to protrude from the front surface 41 of the sheet feed cassette 4, the front surface 41 of the sheet feed cassette 4 becomes uneven. Thus, for example, the feeling of unity in the outer appearance of the sheet feed cassette 4 or the image formation apparatus 100 might be impaired or the user's finger or the like might be caught thereon.

In contrast, the surface of the cover 43 is flush with the front surface 41 of the sheet feed cassette 4 when the cover 43 is closed. That is, the surface of the cover 43 and the front surface 41 of the sheet feed cassette 4 are flush with each other without having a step. Thus, unevenness of the front surface 41 of the sheet feed cassette 4 caused by the mounting portion 44 is suppressed. Therefore, as compared to the case where the cassette display portion 42 protrudes from the sheet feed cassette 4, the feeling of unity in the outer appearance of the sheet feed cassette 4 or the image formation apparatus 100 is not impaired and a user is unlikely to be caught by the cassette display portion 42.

The mounting portion 44 is formed to be recessed in the front surface 41 of the sheet feed cassette 4, and the display sheet 45 can be inserted to and extracted from the mounting portion 44. That is, since the mounting portion 44 is a recessed portion formed in the front surface 41 of the sheet feed cassette 4 and the surface of the cover 43 is flush with the front surface 41 of the sheet feed cassette 4, the cassette display portion 42 does not protrude from the front surface 41. Specifically, the mounting portion 44 has holding portions 441, projection portions 442, the engaged portions 443, a holding surface 444, and the slope surface 445. More specifically, the mounting portion 44 has two holding portions 441 at the upper and lower sides, so that two display sheets 45 can be mounted.

Each holding portion 441 has a gap from the holding surface 444 so that the display sheet 45 inserted into the gap is held between the holding portion 441 and the holding surface 444. The projection portions 442 protrude inward from four corners of the holding portions 441 in order to prevent the display sheets 45 from coming off the holding portions 441. The engaged portions 443 are recessed portions formed in the slope surface 445, and in each recessed portion, the fitted portion (recess) to which the engagement portion 433 of the cover 43 is fitted is also formed.

At the upstream side with respect to the holding surface 444 in the insertion direction of the display sheet 45, the slope surface 445 has a slope gradually recessed toward the holding surface 444 from the front surface 41 of the sheet feed cassette 4, along the insertion direction. In the mounting portion 44, the display sheet 45 can be inserted between the holding portion 441 and the holding surface 444, from the slope surface 445, along a direction parallel to the longitudinal direction (right-left direction) of the front surface 41 of the sheet feed cassette 4. Therefore, a user can easily insert the display sheet 45 to the holding surface 444 by sliding the display sheet 45 from the slope surface 445.

Each display sheet 45 is an elongated member having a plurality of display surfaces on which sheet information is described and which are contiguous in the direction in which the display sheet 45 is inserted into the mounting portion 44. For example, a plurality of sheet sizes are described on one of the display sheets 45, and a plurality of sheet types such as materials or colors of sheets are described on the other display sheet 45. The display sheets 45 are, for example, synthetic paper made from a synthetic resin as a main material, but may be paper. The cover 43 may be provided for each holding portion 441 of the mounting portion 44.

As shown in FIG. 7, each display sheet 45 is inserted into the mounting portion 44 while being folded one or more times in the insertion direction. Specifically, FIG. 7 shows an example in which each display sheet 45 is inserted into the mounting portion 44 while being folded once in the insertion direction. In this case, each display sheet 45 has four display surfaces in total, including front and back surfaces.

In particular, it is desirable that the up-down direction of sheet information described on each display surface of the display sheet 45 and the up-down direction of the sheet feed cassette 4 coincide with each other when the folded part of the display sheet 45 is positioned at the downstream side in the insertion direction. In this case, owing to elasticity caused by the folded part of the display sheet 45, an energizing force acts in such a direction as to cause the display sheet 45 to move to the downstream side in the insertion direction of the mounting portion 44, so that the display sheet 45 is prevented from coming off the mounting portion 44.

[Image Forming Unit 3]

The image forming unit 3 is an electrophotographic-type image forming unit that forms an image on a sheet fed from the sheet feed cassette 4, on the basis of image data read by the image reading unit 2 or image data inputted from an external information processing apparatus. Specifically, the image forming unit 3 includes a photosensitive drum, a charging device, a laser scanning unit (LSU), a developing device, a transfer roller, a cleaning device, a fixing roller, and the like.

As shown in FIG. 1, the image forming unit 3 is located below the image reading unit 2, and the in-body discharge portion 9 is located between the image reading unit 2 and the image forming unit 3 in the vertical direction. A sheet on which an image has been formed by the image forming unit 3 is discharged to the in-body discharge unit 9. The image forming unit 3 has an openable and closable cover member 31 covering the front side of the image forming unit 3, and the cover member 31 is opened and closed when, for example, a toner cartridge is exchanged.

In the image formation apparatus 100, the front side of the in-body discharge portion 9 is opened and a user takes out a sheet in the in-body discharge portion 9 from the front side of the image formation apparatus 100. Here, in the image formation apparatus 100, as shown in FIG. 4, the length of a front surface panel 11 of the support housing 10 in the right-left direction D12 is shorter than the length of the operation unit 5 by a length d1, in a front view of the image formation apparatus 100. Therefore, for example, a user in a low posture when sitting on a wheelchair or the like can easily view the inside of the in-body discharge unit 9. The front surface panel 11 of the support housing 10 is located between the image reading unit 2 and the image forming unit 3, and forms a part of the housing front surface of the image formation apparatus 100.

[Operation Unit 5]

The operation unit 5 is located frontward of the image reading unit 2 and upward of the cover member 31, and includes a touch panel 51 and an operation button 52 which receive user's operation. The touch panel 51 has a display unit such as a liquid crystal display for displaying various information such as an operation screen, and receives user's operation to the display unit. The operation button 52 includes a hardware key such as a start key. In addition, the operation unit 5 includes a rotation shaft 53 parallel to the right-left direction D12 of the image formation apparatus 100. A rotation support portion 11B which rotatably supports the rotation shaft 53 is provided on an upper surface 11A of the front surface panel 11 of the support housing 10. Thus, the operation unit 5 is supported at a position frontward of the image reading unit 2 by the rotation shaft 53 parallel to the right-left direction D12 of the image formation apparatus 100 so as to be rotatable within a predetermined rotation range.

Here, the rotation shaft 53 is provided substantially at the center between the upper end and the lower end of the operation unit 5. Thus, the operation unit 5 is rotatable around an inside position between the upper end and the lower end of the operation unit 5. Without limitation to the center between the upper end and the lower end of the operation unit 5, the rotation shaft 53 may be at an inside position between the upper end and the lower end.

Figure 9:
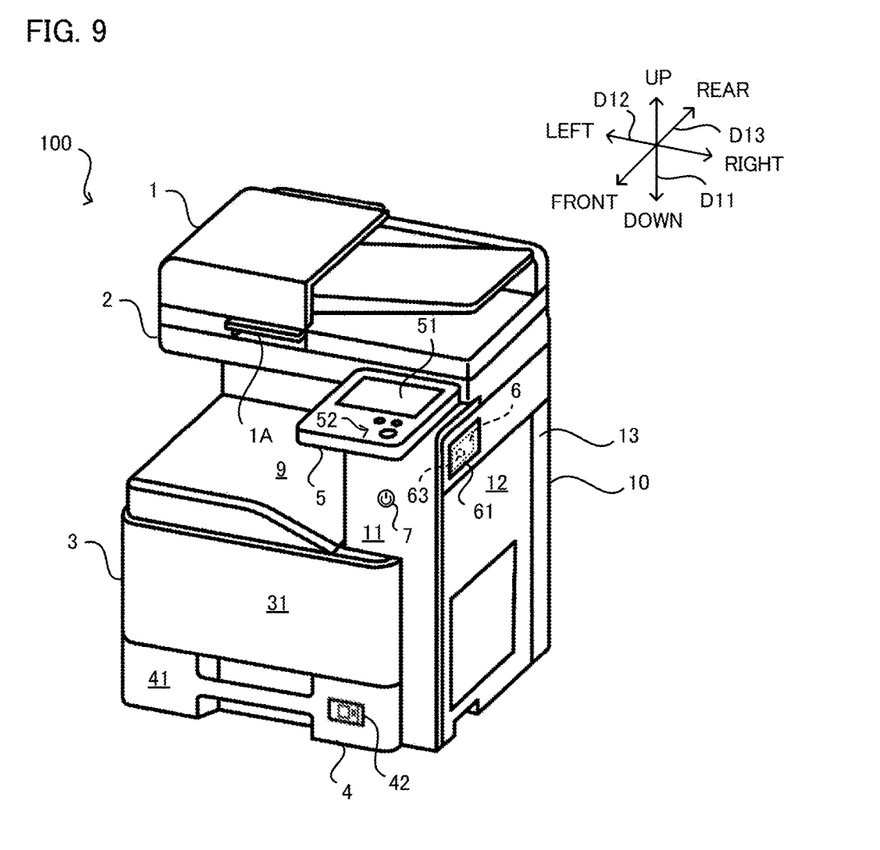
FIG. 9 is a perspective view of the image processing apparatus according to the embodiment of the present invention.
Figure 10:
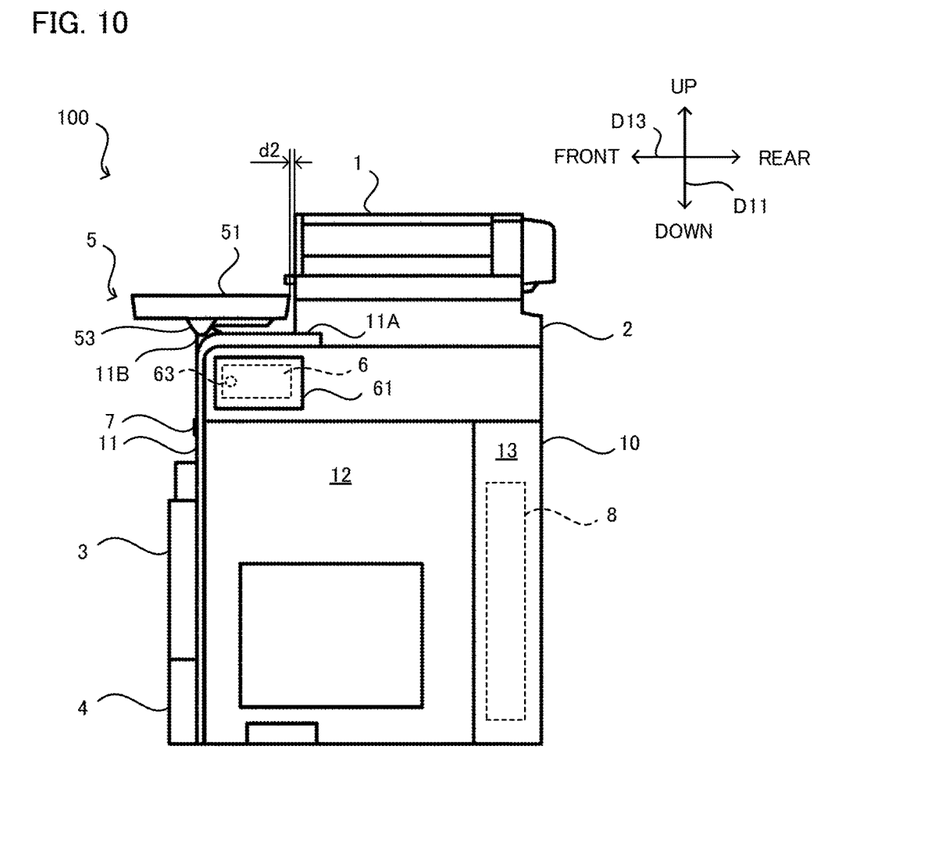
FIG. 10 is a right side view of the image processing apparatus according to the embodiment of the present invention.
Figure 11:
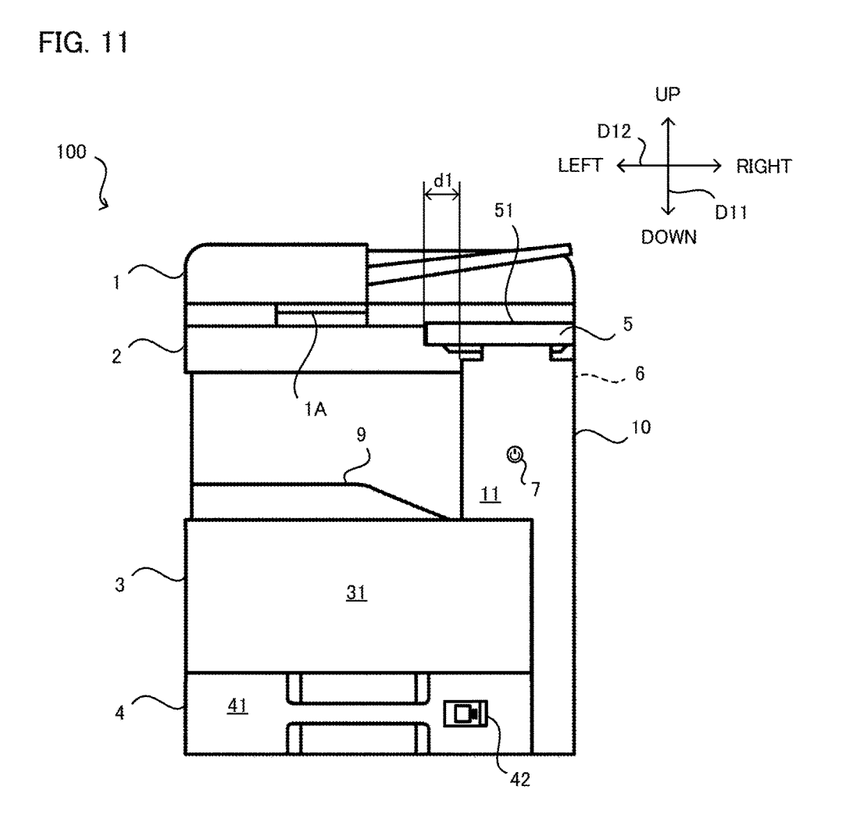
FIG. 11 is a front view of the image processing apparatus according to the embodiment of the present invention.
Figure 12:
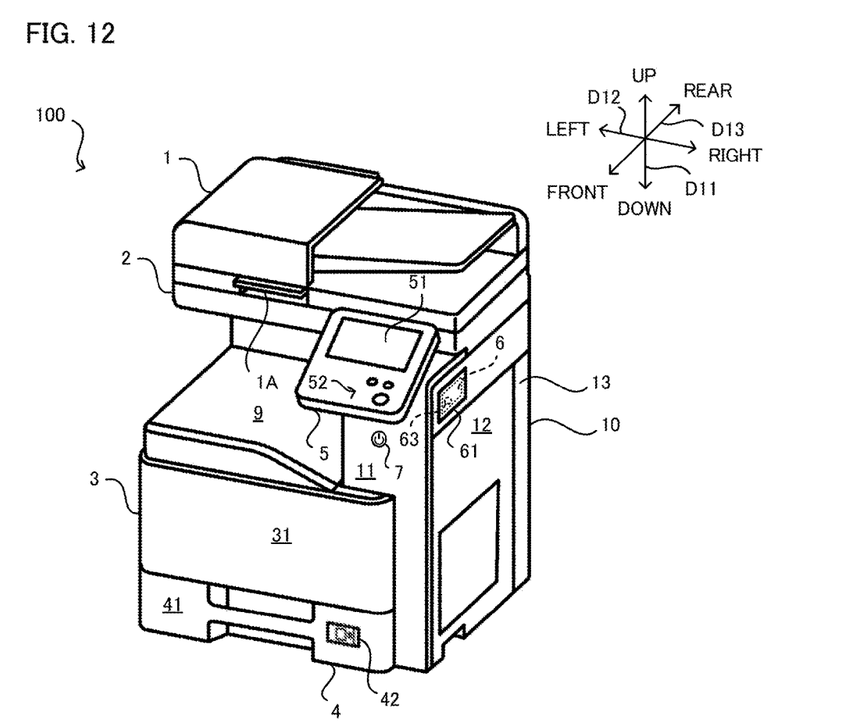
FIG. 12 is a perspective view of the image processing apparatus according to the embodiment of the present invention.
Figure 13:
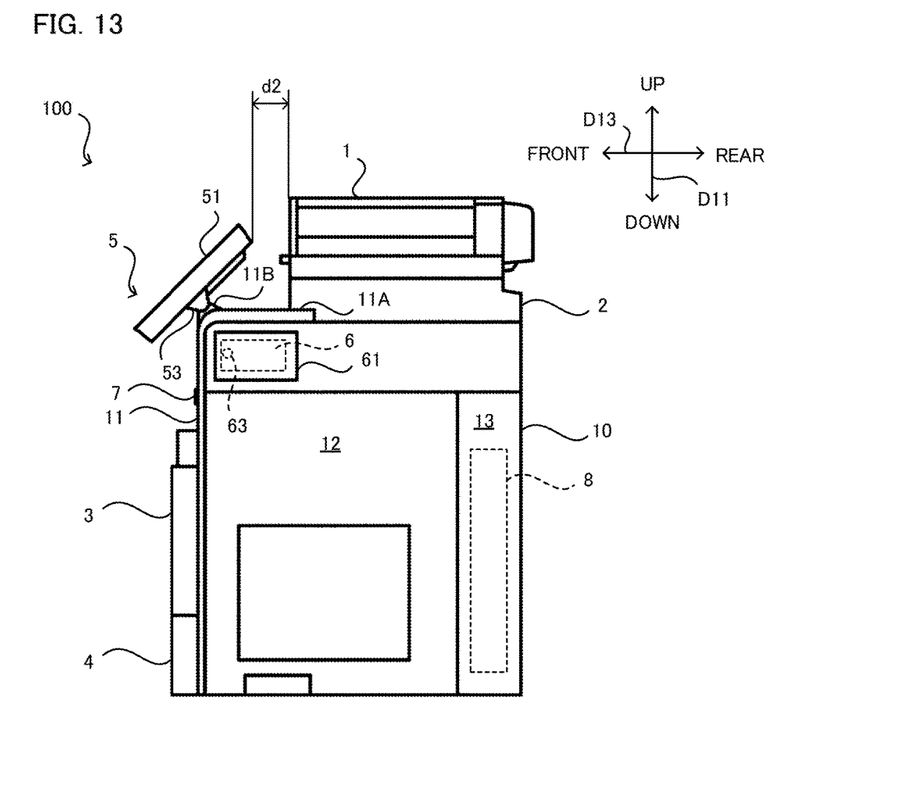
FIG. 13 is a right side view of the image processing apparatus according to the embodiment of the present invention.
Figure 14:
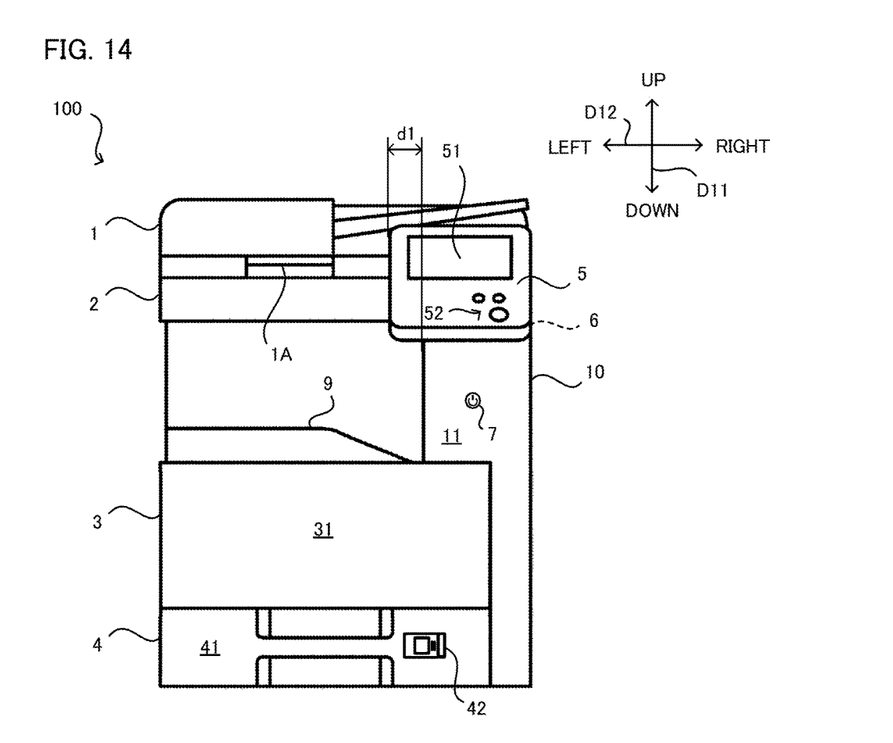
FIG. 14 is a front view of the image processing apparatus according to the embodiment of the present invention.

More specifically, the operation units is rotatable between a first attitude (specific attitude) in which the surface of the operation unit 5 (surface of touch panel 51) is parallel to the vertical plane as shown in FIG. 1 to FIG. 4, and a second attitude in which the surface of the operation unit 5 is parallel to the horizontal plane as shown in FIG. 9 to FIG. 11. In addition, the operation unit 5 can keep its attitude at any position between the first position and the second position. For example, FIG. 12 to FIG. 14 show a state in which the surface of the operation unit 5 is inclined at 45 degrees with respect to the horizontal plane.

That is, in the image formation apparatus 100, the operation unit 5 is rotatable within a rotation range of 90 degrees between the first position and the second position. In this case, in the image formation apparatus 100, a region that is rearward of the operation unit 5 when the operation unit 5 is in the first position and that is downward of the operation unit 5 when the operation unit 5 is in the second position is present inward of the front surface panel 11. Accordingly, as described later, in the image formation apparatus 100, the IC reader 6 is provided using this region.

The first attitude and the second position are not limited to the above case. For example, the first position may be a state in which the surface of the operation unit 5 is slightly inclined with respect to the vertical plane, or a state in which the surface of the operation unit 5 is inclined by, for example, about 15 degrees with respect to the vertical plane. Similarly, the second attitude may be a state in which the surface of the operation unit 5 is slightly inclined with respect to the horizontal plane, or may be a state in which the surface of the operation unit 5 is inclined by, for example, about 15 degrees with respect to the horizontal plane.

As shown in FIG. 3, in the image formation apparatus 100, the surface of the operation unit 5 in the first position is present on the same plane as one or both of the surface of the cover member 31 of the image forming unit 3 and the front surface 41 of the sheet feed cassette 4. In the image formation apparatus 100, one or both of the cover member 31 and the sheet feed cassette 4 may protrude outward relative to the operation unit 5 in the first attitude. In such a configuration, during, for example, conveyance of the image formation apparatus 100, the operation unit 5 in the first position does not protrude relative to the image forming unit 3 and the sheet feed cassette 4 and therefore damage or the like of the operation unit 5 can be prevented.

In the image formation apparatus 100, as shown in FIG. 3, in a side view, when the operation unit 5 is in the first position, a gap d2 is formed between the back surface of the operation unit 5 and the image reading unit 2. Therefore, for example, even in a case where the operation unit 5 is used in an attitude as shown in FIG. 13, a user can view the in-body discharge unit 9 from above through the gap d2 between the back surface of the operation unit 5 and the image reading unit 2, when standing in front of the image formation apparatus 100. In particular, as described above, in a front view of the image formation apparatus 100, the length of the front surface panel 11 of the support housing 10 in the right-left direction D12 is shorter than the length of the operation unit 5 by the length d1, and therefore the visible range of the in-body discharge unit 9 is expanded.

[IC Reader 6]

The IC reader 6 is capable of reading user's information via non-contact communication from an IC card that the user has. Specifically, standing in front of the image formation apparatus 100, a user causes the IC reader 6 to read an IC card that the user has, to log in the image formation apparatus 100, and starts to use the image formation apparatus 100. The login process for the user is executed by the control unit 8. In the present embodiment, the IC reader 6 is an example of an information reading unit, and the IC card is an example of a storage medium. Instead of the IC reader 6, for example, an information reading unit such as a fingerprint verification unit for reading information about the user's fingerprint may be provided in another embodiment.

As shown in FIG. 1 and FIG. 3, the IC reader 6 is housed in a right side surface 12 (example of housing side surface) of the support housing 10, and the surface of the IC reader 6 is covered by a light-transmitting reading cover 61. The surface of the reading cover 61 is flush with the surface of the right side surface 12 of the support housing 10. That is, the surface of the reading cover 61 covering the IC reader 6 and the right side surface 12 of the support housing 10 are flush with each other without having a step. Therefore, the outer appearance of the image formation apparatus 100 is not impaired, and also, a user is unlikely to contact with the IC reader 6 and the reading cover 61.

A user of the image formation apparatus 100 causes the IC reader 6 to read an IC card of the user and then performs operation using the operation unit 5. Thus, at the start of using the image formation apparatus 100, a predetermined series of user's operations are performed. At this time, the more the positions of the IC reader 6 and the operation unit 5 are separate from each other, the wider the necessary operation range for the user is. In this regard, in the image formation apparatus 100, the IC reader 6 and the operation unit 5 are located so that the necessary operation range when a user uses the IC reader 6 and the operation unit 5 is reduced.

Specifically, in the image formation apparatus 100, the IC reader 6 is located in such a region that a part of the IC reader 6 is present rearward of the operation unit 5 in the first attitude in which the surface of the operation unit 5 is closest to the vertical plane, and a part of the IC reader 6 is present downward of the operation unit 5 in the second position in which the surface of the operation unit 5 is closest to the horizontal plane. Thus, in the image formation apparatus 100, the space inward of the front surface panel 11, which occurs due to the configuration in which the operation unit 5 is rotatable within the rotation range between the first position and the second position via the rotation shaft 53 at an inside position between the upper end and the lower end of the operation portion 5, is used as a region for providing the IC reader 6.

Thus, in the image formation apparatus 100, the IC reader 6 is located near the operation unit 5, and therefore the necessary operation range when a user causes the IC reader 6 to read the IC card and then operates the operation unit 5, is reduced.

FIG. 2 is a perspective view of the image formation apparatus 100 when the reading cover 61 and the IC reader 6 are removed. As shown in FIG. 2, an IC holder 62 is formed in the right side surface 12 of the support housing 10, and the IC reader 6 is held by the IC holder 62. The IC reader 6 and the IC holder 62 are hidden when the reading cover 61 is attached to the image reading unit 2.

The IC reader 6 includes a lighting portion 63 such as an LED used for displaying the operation state of the IC reader 6, and the like. When reading of information from the IC card has been normally performed by the IC reader 6, the lighting portion 63 is lit in green, and when reading of information from the IC card has not normally been performed by the IC reader 6, the lighting portion 63 is lit in red. The reading cover 61 is a light-transmitting smoked cover having gray color, black color, or the like, and the lighting state of the lighting portion 63 is visible via the reading cover 61 from outside.

[Main Power Switch 7]

The main power switch 7 is an operation button for switching on or off the main power of the image formation apparatus 100. Specifically, the main power switch 7 is used for turning on or off all the functions of the copy function, the printer function, the scanning function, and the facsimile function of the image formation apparatus 100.

For example, in the image formation apparatus 100, a transformer is provided to a power supply unit (not shown) which converts power supplied from a commercial AC power supply. The main power switch 7 is a push-type switch or a seesaw-type switch for switching between establishment and disconnection of a power path connected to the secondary side of the transformer provided to the power supply unit. Thus, in the image formation apparatus 100, presence and absence of supply of power to various circuits connected to the secondary side of the transformer are switched by the main power switch 7.

In the image formation apparatus 100, besides the main power switch 7, a power saving key (not shown) may be provided for shifting to and cancelling a power saving mode in which functions other than some functions such as the facsimile function of the image formation apparatus 100 are turned off. For example, the power saving key is provided to the operation unit 5, and the image formation apparatus 100 shifts to the power saving mode by the power saving key being operated.

In the configuration in which the main power switch 7 is located on the front surface panel 11 immediately under the operation unit 5, user operability is improved while there is a problem that the main power switch 7 is easily recognized by a user. In this regard, in the image formation apparatus 100, the main power switch 7 is located in consideration of balance between operability of the main power switch 7 and visibility thereof by a user.

Specifically, the main power switch 7 is located at a position that is between the operation portion 5 in the first attitude and the cover member 31 of the image forming portion 3 and that is retracted rearward relative to the surface of the operation unit 5 in the first attitude and the surface of the cover member 31. In more detail, in the image formation apparatus 100, the front surface panel 11 of the support housing 10 is located between the operation unit 5 in the first attitude and the cover member 31 of the image forming unit 3, and is retracted rearward relative to the surface of the operation unit 5 in the first attitude and the surface of the cover member 31. The main power switch 7 is located, on the front surface panel 11, at a position between the lower end of the operation unit 5 in the first attitude and the upper end of the cover member 31 of the image forming unit 3.

Thus, the main power switch 7 and the operation unit 5 are arranged close to each other, so that the necessary operation range for a user is reduced. Meanwhile, since the main power switch 7 is located on the front surface panel 11 retracted rearward relative to the operation unit 5 and the image formation unit 3, the main power switch 7 is prevented from outstanding too much.

In particular, as shown in FIG. 4, when the operation unit 5 is in the first position, the touch panel 51, the operation button 52, and the main power switch 7 are arranged in order of the touch panel 51, the operation button 52, and then the main power switch 7 from the upper side to the lower side in the vertical direction. Thus, the operation button 52 and the main power switch 7 to be operated by a user are arranged in a concentrated manner at positions close to each other, so that user operability is improved.

[Control Unit 8]

As shown in FIG. 3, the control unit 8 is provided in a control box 13 on the back surface side of the side surface 12 of the image formation apparatus 100. The control unit 8 includes control devices such as a CPU, a ROM, and a RAM (not shown). The CPU is a processor for executing various calculation processes. The ROM is a nonvolatile storage unit in which information such as a control program for causing the CPU to execute various processes is stored in advance. The RAM is a volatile storage unit used as a temporary storage memory (working area) for various processes executed by the CPU. The control unit 8 executes various processes, using the CPU, in accordance with various control programs stored in advance in the ROM.

Specifically, the control unit 8 reads an image of a document using the image reading unit 2 by executing a predetermined image reading process. In addition, the control unit 8 forms an image on a sheet using the image forming unit 3 by executing a predetermined image formation process. Further, the control unit 8 executes a display control process for controlling a content displayed on the touch panel 51 provided to the operation unit 5.

Figure 15:
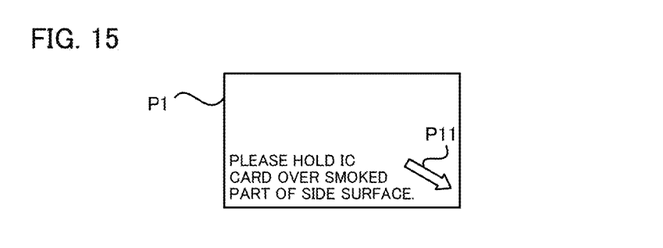
FIG. 15 is a view showing an example of a display screen of the image processing apparatus according to the embodiment of the present invention.
Figure 16:
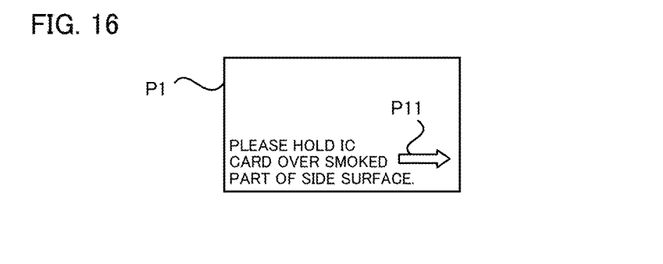
FIG. 16 is a view showing another example of a display screen of the image processing apparatus according to the embodiment of the present invention.

Specifically, when a user touches the touch panel 51 of the operation unit 5 in a state in which the user has not logged in the image formation apparatus 100, the control unit 8 causes the touch panel 51 to display a display screen P1 for promoting the user to let the IC card be read by the IC reader 6. Here, FIG. 15 and FIG. 16 are views showing examples of the display screen P1. FIG. 15 is a display example of the display screen P1 when the operation unit 5 is in the first attitude, and FIG. 16 is a display example of the display screen P1 when the operation unit 5 is in the second attitude.

As shown in FIG. 15 and FIG. 16, the control unit 8 displays, on the display screen P1 of the touch panel 51 of the operation unit 5, a message indicating that the IC card needs to be read, and a position guide image P11 as a position guide for the IC reader 6. The control unit 8 changes the content of the position guide in accordance with the rotation state of the operation unit 5. An inclination detection sensor (not shown) is provided to the operation unit 5, and the rotation state of the operation unit 5 detected by the inclination detection sensor is inputted to the control unit 8.

Specifically, when the operation unit 5 is in the first position, the IC reader 6 is present to the lower right as seen from the touch panel 51. Therefore, as shown in FIG. 15, the control unit 8 displays an arrow indicating the lower right direction, as the position guide image P11. On the other hand, when the operation unit 5 is in the second attitude, the IC reader 6 is present to the right as seen from the touch panel 51. Therefore, as shown in FIG. 16, the control unit 8 displays an arrow indicating the rightward direction, as the position guide image P11. Thus, it is possible to clearly suggest the position of the IC reader 6 to a user in accordance with rotation of the operation unit 5.

The invention claimed is:

1. An image formation apparatus comprising:
    an image reading unit configured to read an image from a document;
    an image forming unit located below the image reading unit and configured to form an image on a sheet;
    a support housing located between the image reading unit and the image forming unit and forming at least a part of a housing side surface and a housing front surface of the image formation apparatus, the housing side surface being on either a right side or a left side in a right-left direction, the housing front surface being on a front side in a front-rear direction;
    an operation unit configured to receive user's operation and supported at a position frontward of the image reading unit by the support housing so as to be rotatable within a predetermined rotation range around a rotation shaft parallel to the right-left direction of the image formation apparatus;
    an information reading unit configured to read information about the user and housed in the housing side surface so that a part of the information reading unit is present rearward of the operation unit in a first position in which a surface of the operation unit is closest to a vertical plane, and a part of the information reading unit is present downward of the operation unit in a second position in which the surface of the operation unit is closest to a horizontal plane; and
    a control unit configured to cause a display unit to display a location for the information reading unit housed in the housing side surface, wherein the control unit changes a content of the location in accordance with a rotation state of the operation unit.

2. The image formation apparatus according to claim 1, wherein
    the first position is an attitude in which the surface of the operation unit is parallel to the vertical plane, and the second position is an attitude in which the surface of the operation unit is parallel to the horizontal plane.

3. The image formation apparatus according to claim 1, wherein
the rotation shaft is located at an inside position between an upper end and a lower end of the operation unit.

4. The image formation apparatus according to claim 3, wherein
the rotation shaft is located at a center between the upper end and the lower end of the operation unit.

5. The image formation apparatus according to claim 1, wherein
a surface of a reading cover covering the information reading unit and a side surface of the support housing are flush with each other.

6. The image formation apparatus according to claim 1, wherein
the information reading unit is capable of reading information from a storage medium via non-contact communication.

7. The image formation apparatus according to claim 1, further comprising:
the display unit provided to the operation unit and configured to display information.

8. The image formation apparatus according to claim 1, wherein
a surface of the information reading unit is covered with a reading cover, and a surface of the reading cover and the housing side surface are flush with each other without having a step.

9. The image formation apparatus according to claim 1, wherein
the housing side surface is a right side surface of the image forming apparatus.

10. The image formation apparatus according to claim 1, wherein
an in-body discharge unit is disposed adjacent to the support housing between the image reading unit and the image forming unit,
a front side of the in-body discharge unit is opened, and
the operation unit is longer on an in-body discharge unit side than the support housing in the right-left direction.

11. The image formation apparatus according to claim 1, wherein
a main power switch is provided on a front surface panel of the support housing, the front surface panel forming a part of the housing front surface, and
the main power switch is located at a position between a lower end of the operation unit in the first position and the image forming unit.

\* \* \* \* \*